June 29, 1943.  G. F. BROCKETT  2,322,818
FLOAT
Filed March 30, 1942  2 Sheets-Sheet 1
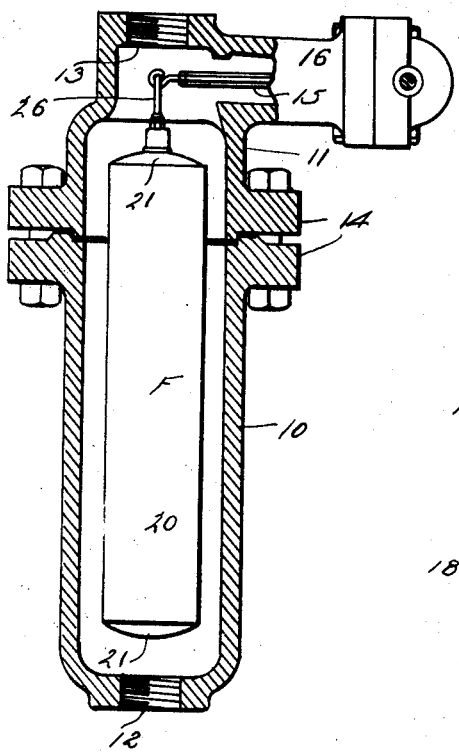
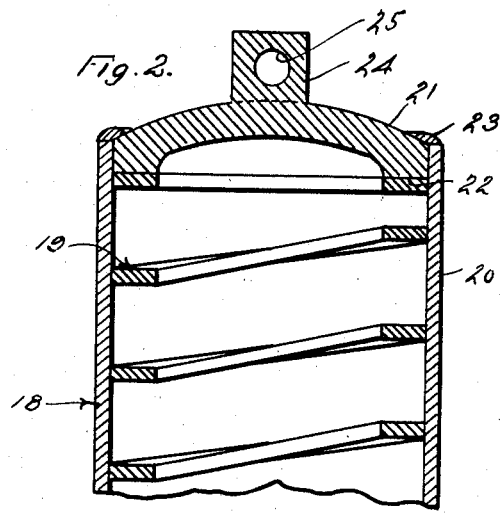
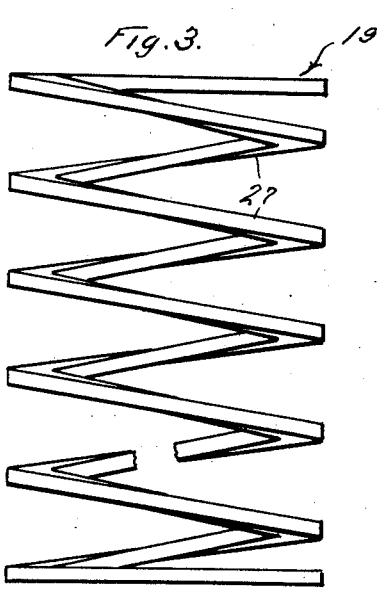
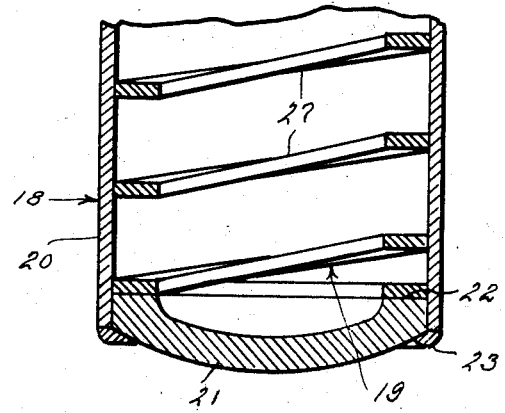
Inventor
Glenn F. Brockett
by
Attorney June 29, 1943. G. F. BROCKETT 2,322,818
FLOAT
Filed March 30, 1942 2 Sheets-Sheet 2

Inventor
Glenn F Brockett
by
Attorney

Patented June 29, 1943

2,322,818

UNITED STATES PATENT OFFICE 2,322,818

FLOAT

Glenn F. Brockett, Marshalltown, Iowa, assignor to Fisher Governor Company, Marshalltown, Iowa, a corporation of Iowa Application March 30, 1942, Serial No. 436,845

4 Claims. (Cl. 137—104)

This invention relates to buoyant members or floats of the class employed in float controls and other liquid level responsive devices and specific gravity responsive devices. A general object of this invention is to provide a practical, effective and inexpensive float capable of withstanding very high external pressures.

Another object of this invention is to provide a float embodying a novel internal reenforcing means which dependably supports the walls of the float against distortion and collapse and yet is light in weight. The improved reenforcing means of the present invention is adequate to brace or reenforce the float walls against high external pressures and yet is light in weight so that a float of reasonable or small proportions will have the required buoyancy or displacement effect.

Another object of this invention is to provide a float of the character mentioned in which the reenforcing means comprises a single inexpensive readily formed member which is easily installed.

Another object of this invention is to provide a float of the character referred to in which the provision of the reenforcing means does not necessitate altering or changing the general float structure and does not require a departure from the regular shape of the float.

A further object of this invention is to provide a float of the character referred to in which the reenforcing means dependably and adequately supports and sustains the cylindrical wall of the float throughout the length of the wall.

Figure 4:
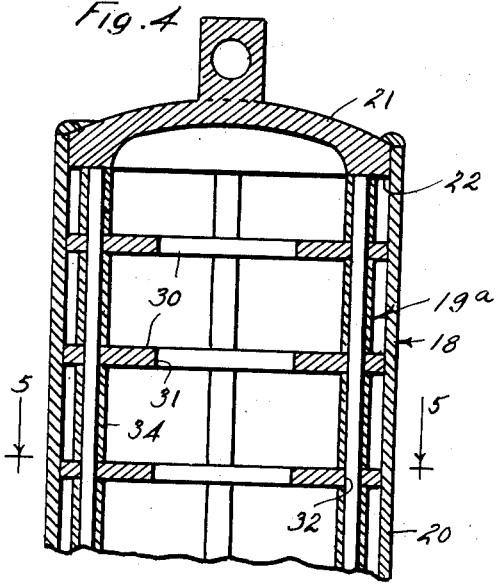
Figure 6:
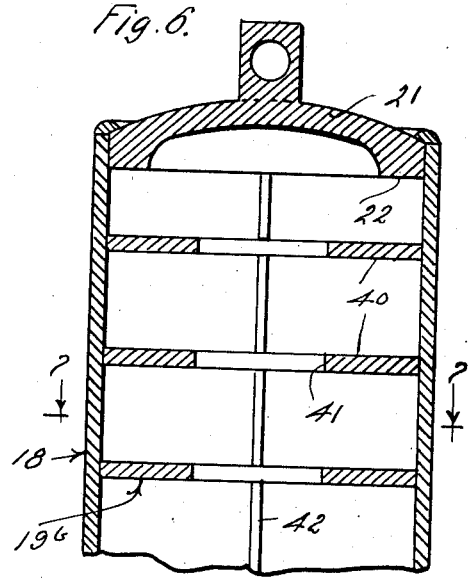
Figure 5:
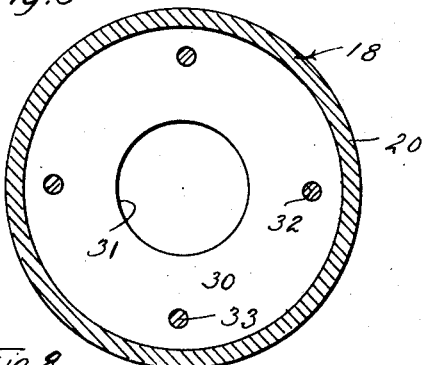
Figure 7:
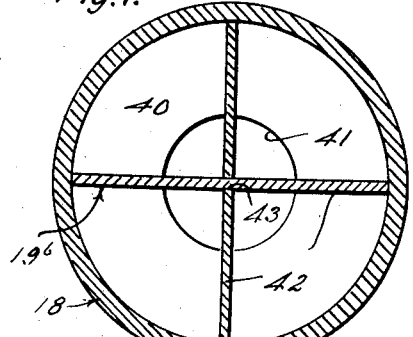
Figure 8:
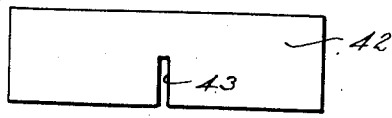

The various objects and features of my invention will be fully understood from the following detailed description of typical preferred forms and applications of my invention, throughout which description reference is made to the accompanying drawings, in which:

Fig. 1 is a side elevation of a float of the present invention in the operative position within a float cage. Fig. 2 is an enlarged longitudinal detailed sectional view of the float shown in Fig. 1. Fig. 3 is an enlarged side elevation of the reenforcing means of the float illustrated in Figs. 1 and 2. Fig. 4 is a view similar to Fig. 2 illustrating another form of the invention. Fig. 5 is a horizontal detailed sectional view taken as indicated by line 5—5 on Fig. 4. Fig. 6 is a view similar to Fig. 2 illustrating still another form of the invention. Fig. 7 is a horizontal detailed sectional view taken as indicated by line 7—7 on Fig. 6 and Fig. 8 is a side elevation of one of the spacers of the structure shown in Figs. 6 and 7.

The present invention may be embodied in floats for use with different types and classes of equipment and for use in various situations. In the drawings I have illustrated a class or type of float suitable for use in float controls of the general character disclosed in my co-pending application Serial No. 430,161, filed February 9, 1942, entitled "Liquid level responsive means." It is to be understood that the present invention is not to be construed as limited or restricted to the specific details herein disclosed but is to be construed as contemplating any features or modifications that may fall within the scope of the claims.

As illustrated in Fig. 1 the float F is arranged within a float cage made up of a body section or main section 10 and a top section 11. The float F is an elongate generally cylindrical element and the float cage corresponds generally in shape to receive the float F with suitable operating clearance. The lower section 10 of the cage has a tapped or threaded opening 12 to receive a fluid-handling pipe and the upper wall of the top section 11 has a similar opening 13 for receiving a pipe so that the interior of the cage may be maintained in communication with the vessel whose liquid level is to govern the action of the float control. A flange and bolt connection 14 connects the top section 11 with the main body section 10. The float F is suspended from a generally horizontal float lever 15 which extends through a lateral arm 16 of the top section 11. The float lever 15 is connected with the other operative or movable elements of the float control not shown.

The embodiment of the invention illustrated in Figs. 1, 2 and 3 of the drawings may be said to comprise, generally, a hollow float body 18 and a reenforcing means or member 19 for the body.

The float body 18 is an elongate hollow structure proportioned to give the float F the required displacement or buoyant power and to operate in the cage 10 with substantial clearance. The float body 18 comprises an elongate tubular main section 20 and heads 21 for closing the ends of the tubular section 20. The section 20 is preferably a cylindrical tubular part of uniform wall thickness and diameter throughout. The ends of the body section 20 may be flat and plain and the walls of the section are imperforate. As illustrated, the main float body section 20 is of substantial length to extend through the cage from adjacent the lower end of the cage section 10 to within the upper cage section 11.

The heads 21 are provided to close the opposite ends of the tubular body section 20. The heads 21 are similar or identical and are proportioned to rather accurately fit within the opposite ends of the section 20. If desired, the heads 21 may be plain flat closures but in the preferred construction illustrated the heads 21 are arched or bowed in cross section to present convex external surfaces and concave internal surfaces. The inner sides of the heads 21 are formed to have flat annular surfaces or seats 22 adjacent the wall of the body section 20. The ends or heads 21 are suitably fixed and sealed to the body section 20. For example, the heads 21 may be secured to the opposite ends of the section 20 by annular ridges of welding 23 and the welding 23 may be such that it assures dependable pressure-tight seals between the heads 21 and the body section 20. The upper head 21 is formed to facilitate the connection of the float with the lever 15. In the case illustrated a central boss 24 is formed or provided on the upper head 21 and has an eye or opening 25 for receiving the end part of a link 26 which suspends the float from the lever 15. It should be observed that the body 18 of the float is extremely simple in construction.

The reenforcing member or means 19 is a feature of the invention. The means 19 operates to reenforce the wall of the tubular body section 20 and the heads 21. In accordance with the invention the means 19 comprises a single one piece element or part. This part is in the form of a cylindrical helical spring or coiled compression spring 27. The spring 27 extends axially or longitudinally through the float body section 20 from one head 21 to the other and engages or cooperates with the internal surface of the section 20 and the seats 22 of the heads. The stock or material of the spring 27 is preferably, though not necessarily, square or rectangular in cross section so that the spring has more extensive cooperation with the internal surface of the main body section 20. The opposite end portions of the spring 27 may be shaped to flatly bear on the seats 22 throughout substantially the entire extent of the seats, for example, as illustrated, the endmost convolutions of the spring may lie in flat planes to evenly bear on the seats 22. The reenforcing member or spring 27 may be under some compression so that it bears axially outward against the ends or heads 21 and so that it is expanded radially to tightly bear radially outward against the internal surface of the body section 20. The compressing of the spring 27 assures equal spacing of its convolutions even though they may rub or catch on the wall of the body section 20 when inserted in the section.

The reenforcing member or spring 27 may be constructed and proportioned to adapt the float for use under different pressure conditions, for example, the spring may be heavy and may have its convolutions in close relation to effectively resist high external pressures or the spring may be light or may have its convolutions spaced a substantial distance apart where the external pressure is not so high. In assembling the float one head 21 is permanently fixed or welded to the body section 20 and the spring 27 is then inserted into position through the other end of the body. The other head 21 is then arranged in place or forced to its position on the end of the body section 20 and secured and sealed to the body as by the welding 23 to complete the assembly. It should be observed that the float is easily and quickly assembled.

In the use or operation of the float F the float cage 10 may handle or contain fluid under substantial pressures. These pressures, of course, tend to distort or collapse the hollow float F. The reenforcing member or spring 27 constructed and arranged as above described effectively and dependably resists such distortion and collapsing of the float. The opposite ends of the spring 27 bear against the heads 21 and the peripheral surface of the spring bears against the internal surface of the tubular section 20. Accordingly, the spring 27 resists distortion or collapsing of the tubular section 20 under pressure. The entire confined spring 27 acts as a rigid brace or reenforcement extending throughout the length of the float. External pressure on the wall of the section 20 is applied directly to the spring 27. The spring 27 cannot yield because its opposite ends are held or confined and the spring is confined throughout its circumference and, therefore, assumes such forces as a continuous rigid member. In a like manner the pressures acting on the heads 21 are directly transmitted to the spring 27 and because the periphery of the spring is confined throughout its extent the spring cannot expand radially and, therefore, cannnot yield to axial pressure. Each length or sector of the spring 27 is, in effect, an arch rigidly and fixedly supported at its opposite ends and radial forces applied to this arch by the surrounding cylindrical wall of the section 20 are directly assumed by the rigidly and fixedly supported arch or sector. In actual practice it has been found that the reenforcing member or spring 27 effectively and dependably reenforces the hollow float body 18 against high external pressures. It should be observed that the spring 27 may be relatively light in weight and yet offer a maximum resistance to distortion for its weight.

The embodiment of the invention illustrated in Figs. 4 and 5 of the drawings may be said to comprise, generally, a hollow body 18 and reenforcing means 19ª for the body.

The body 18 of the float may be the same as in the preceding form of the invention and corresponding reference numerals are applied to its several parts.

In this form of the invention the reenforcing means 19ª comprises a multiplicity of spaced bulk heads 30 engaged within the tubular section 20 of the body 18. The bulk heads 30 are ring-like or washer-like parts whose peripheries engage with the internal surface of the section 20. Comparatively large central openings 31 may be provided in the bulk heads 30 to reduce the weight. The bulk heads 30 may be formed of flat stock and, in accordance with the invention, lie in longitudinally spaced planes of the float. Each bulk head 30 has a plurality of circumferentially spaced openings 32 in adjacent spaced relation to its periphery. In the case illustrated there are four spaced openings 32 in each bulk head 30 and the openings are equally spaced, it being understood that the number of openings 32 may vary in different constructions. The bulk heads 30 are spaced throughout the length of the elongate float body 18 and the number of bulk heads employed is dependent upon the fluid pressure conditions to be encountered.

The reenforcing means 19ª further includes means for maintaining the bulk heads 30 in the spaced apart relation. The spacing means includes rods 33 passing through the openings 32 of the bulk heads 30. The rods 33 may extend from one head 21 to the other and may have their ends bearing on the seats 22. Spacers 34 are provided on the rods 33 to space the bulk heads 31 one from the other and to space the endmost bulk heads from the heads 21. The spacers 34 may be lengths of thin walled tubing and engage against the opposite sides or faces of the bulk heads 30 to hold the bulk heads in the required spaced relation.

The embodiment of the invention illustrated in Figs. 6, 7 and 8 of the drawings includes the float body 18 and a reenforcing means 19b for reenforcing the body against external pressures.

The body 18 may be the same as the body in the preceding forms of the invention and corresponding reference numerals are applied to its corresponding parts.

The reenforcing means 19b shown in Figs. 6, 7 and 8 includes a plurality of bulk heads 40 spaced longitudinally of the body 18. The bulk heads 40 are similar to the bulk heads 30, being flat disc-like members engaged in the tubular float body section 20 to occupy spaced horizontal planes. In practice the bulk heads 40 may be annular being provided with rather large central openings 41 to reduce the weight of the reenforcing assembly. The peripheries of the bulk heads 40 conform to and cooperate with the internal surface of the section 20. There is preferably a substantial number of bulk heads 40 and the bulk heads are spaced throughout the length of the float body 18 to adequately brace or reenforce the float body against the external fluid pressures.

The means for maintaining the bulk heads 40 in the spaced apart relation includes sets or pairs of spacers 42 engaged between the several bulk heads 40 and engaged between the endmost bulk heads and the heads 21. The spacers 42 may be flat strips or plates adapted to extend diametrically through the interior of the tubular body section 20 so that their ends engage with the internal surface of the section 20. The spacers 40 of each set or pair are in crossed relation. As shown in Fig. 8 of the drawings each spacer 42 has a vertical notch or slot 43 spaced midway between its opposite ends. The slots 43 have a vertical length substantially equal to one-half the vertical height of the spacers. One spacer 42 of each pair has the slot 43 in its upper edge while the other spacer 42 of the pair has its slot 43 in its lower edge and the two spacers are engaged or fitted one with the other so that each slot 43 receives a central portion of a spacer. Thus, the spacers 42 are interengaged in the crossed relation shown in Fig. 7. The upper and lower edges of the spacers 42 are flat and horizontal and are cooperable with the opposing surfaces of the spaced bulk heads 40. The endmost pair of spacers 42 have their outer edges bearing on the seats 22. It is believed that it will be apparent how the pairs of crossed spacers 42 maintain the bulk heads 40 in the spaced apart relation and hold the endmost bulk heads 40 spaced from the heads 21.

It is believed that the utility and practicability of the structures shown in Figs. 4 to 8, inclusive, will be readily understood from the foregoing detailed descriptions. The bulk heads 30 and 40 effectively brace and reenforce the walls of the cylindrical float to prevent it from being excessively distorted and collapsed by external fluid pressures. The bulk heads 30 and 40 are spaced throughout the length of the main tubular section 20 to provide substantially uniform support for its wall. The strength and number of the bulk heads 30 and 40 may be related to the expected or intended external pressures to assure the adequate reenforcement of the float. The rods 33 of the structure of Figs. 4 and 5 brace or reenforce the heads 21 against the external pressures and in the structure of Figs. 6, 7 and 8 the spacers 42 serve a similar function. Thus, the entire wall of the float is adequately reenforced against the external pressures. It should be observed that the reenforcing means of Figs. 4 and 5 and Figs. 6, 7 and 8 are simple and inexpensive, are light in weight and are easily assembled.

Having described typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A float comprising an elongate tubular rigid body section, imperforate heads rigidly secured to the body section to close its opposite ends, and means for reinforcing the body section and heads against external pressures comprising a spiral spring formed of flat sided stock, the spring having its ends bearing axially outward against the head to be under compression and to resist inward forces on the heads, the compression of the spring urging the flat sided convolutions radially outward against the wall of the body section to resist inward forces on the section.

2. A float comprising an elongate tubular rigid body section, imperforate heads rigidly secured to the body section to close its opposite ends, and means for reinforcing the body section and heads against external pressures comprising a spiral spring in the section formed of stock which is polygonal in cross section, the opposite end portions of the spring having extensive flat portions which are in parallel relation and which bear axially outward against the inner sides of the heads to resist inward forces on the heads and to hold the spring under compression, the compression of the spring urging a continuous broad surface of the spring outwardly against the wall of said section throughout the several convolutions of the spring to resist inward forces on the section.

3. A float comprising an elongate tubular rigid body section, imperforate heads rigidly secured to the body section to close its opposite ends, and means for reinforcing the body section and heads against external pressures comprising a spiral spring formed of stock having one cross sectional dimension materially greater than the other and at least one broad surface, said greatest dimension being substantially radial relative to the longitudinal axis of the spring and said surface being the external surface of the spring, the spring being under compression between the heads so that said surface is urged outwardly against the wall of the section.

4. A float comprising an elongate tubular rigid body section, heads closing the ends of the section, and means in the section reenforcing its wall against external pressures, said means including a spiral spring in said section having its ends bearing against the heads so that it is held under compression between the heads and its convolutions are urged outwardly against the internal surface of said section throughout substantially its entire length.

GLENN F. BROCKETT.